United States Patent [19]

Shimizu et al.

[11] Patent Number: 4,481,742
[45] Date of Patent: Nov. 13, 1984

[54] MACHINE TOOL ELEVATING AND GUIDING APPARATUS

[75] Inventors: Masami Shimizu; Hisao Yoshikawa; Sosaku Kimura; Kazuo Shiba; Fumio Maeno; Shigehiro Fuwa; Kuniyuki Mihara, all of Tokorozawa, Japan

[73] Assignee: Citizen Watch Co., Ltd., Tokyo, Japan

[21] Appl. No.: 473,511

[22] Filed: Mar. 9, 1983

[30] Foreign Application Priority Data

May 12, 1982 [JP] Japan .................................. 57-78312

[51] Int. Cl.³ ............................................ B24B 49/16
[52] U.S. Cl. ................................ 51/165.8; 51/123 R; 51/134
[58] Field of Search ............. 51/165.8, 165.81, 165.85, 51/123 R, 134, 165.9

[56] References Cited

U.S. PATENT DOCUMENTS

| | | | |
|---|---|---|---|
| 2,946,161 | 7/1960 | Schultze | 51/165.8 |
| 3,701,220 | 10/1972 | Wespi | 51/165.8 |
| 3,742,653 | 7/1973 | Kano | 51/165.9 |
| 3,763,599 | 10/1973 | Hofler | 51/165.8 |
| 3,822,512 | 7/1974 | Mercer | 51/165.81 |

*Primary Examiner*—Harold D. Whitehead
*Attorney, Agent, or Firm*—Jordan and Hamburg

[57] ABSTRACT

A machine tool elevating and guiding apparatus comprising a tool mounting head which is movable vertically between a pair of guide columns. Guide surfaces on the guide columns are positioned closely adjacent to guided surfaces on the tool mounting head and a flow of pressurized fluid is passed at a fixed pressure between the guide and guided surfaces, such as to eliminate tilting of the tool mounting head. At least one guide surface serves as a reference surface, with a thin film of pressurized lubricating oil being formed between this and an adacent guided surface. The tool mounting head is mounted on an elevating feed screw, with means provided whereby the weight of the head is supported independently of that screw, so that a very high degree of precision in vertical positioning of the tool mounting head is attained.

2 Claims, 5 Drawing Figures

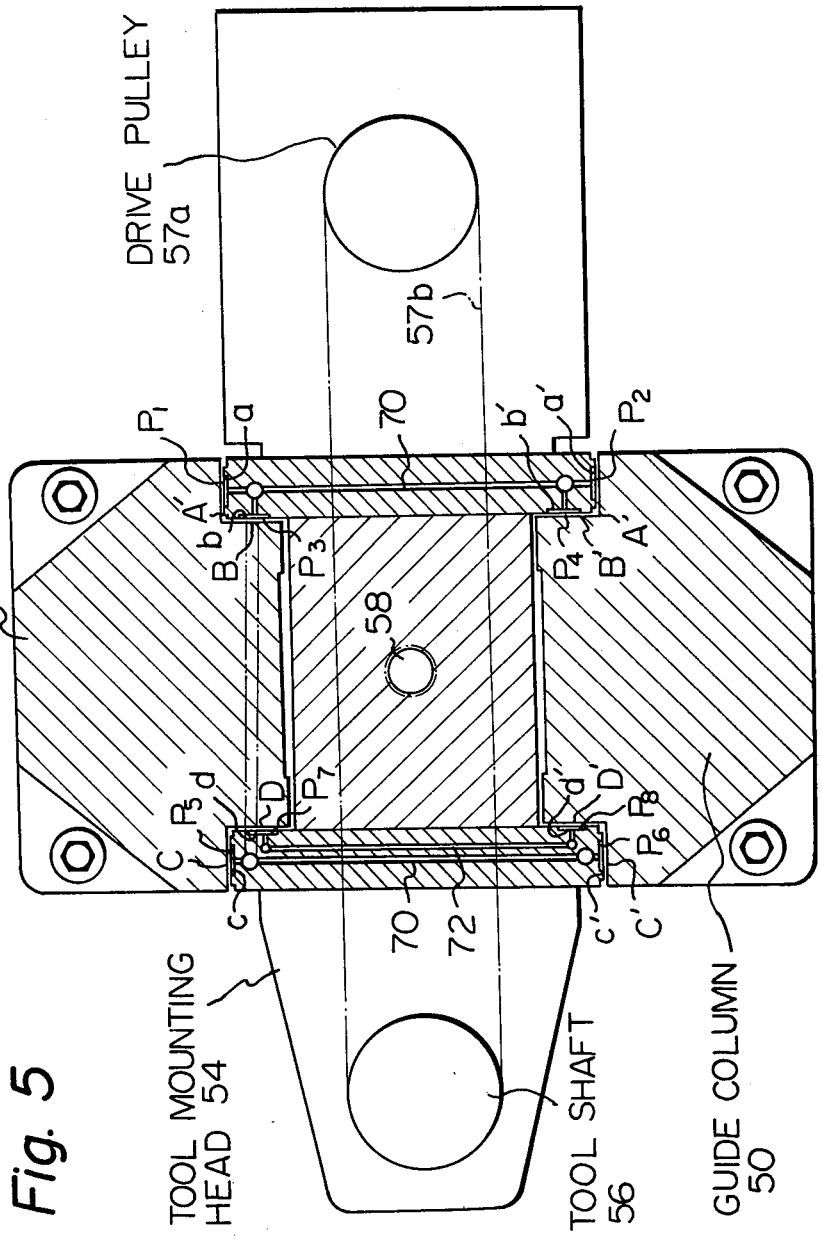

MACHINE TOOL ELEVATING AND GUIDING APPARATUS

BACKGROUND OF THE INVENTION

The present invention relates to a machine tool elevating and guiding apparatus which is suitable for high precision machining.

In order to perform machining such as grinding of a plane face of a workpiece to a very high degree of accuracy, it is essential that the workpiece can be precisely and reproducibly set in a predetermined position and orientation with respect to the cutting tool. This precision must be maintained as a number of workpieces are successively machined and removed from the machine. In the prior art, it has been necessary to use substantially expensive and complex measuring means in order to achieve such a precision of workpiece positioning accuracy, and in addition the time consumed in setting each workpiece into the requisite position and orientation results in a substantial increase in the time required for machining to be carried out.

In order to perform machining with a very high level of accuracy, the following four conditions must basically be met:

1. Improvement of the method of machining
2. Enhancement of the accuracy of guiding the various elements involved in machining.
3. Improvement of the rigidity or "stiffness" of the feed system which presses the cutting tool against the workpiece to perform machining, and reduction of deviations in the position of the cutting tool caused by that feed system.
4. Assurance of position stability of the workpiece with respect to vibration and heat.

Each of the above requirements will now be discussed. As regards the first requirement, for improvement of the machining method, it has been general practice in the prior art for the tool shaft of a grinding machine (i.e. a grinding machine in which that shaft is vertically disposed) to be supported by a ball-roller bearing. Using such a bearing results in a low degree positioning accuracy for the tool shaft, and hence for the cutting tool, in the vertical direction. This results in a lowering of the accuracy of machining. In addition, it is difficult to precisely control the machining force applied to the workpiece when such bearings are utilized. However with the present invention, a configuration is adopted whereby tool mounting head in which the tool shaft rotates is supported by a static pressure bearing provided on the elevating feed screw which raises or lowers the tool mounting head. A load compensation system is coupled to the tool mounting head and controlled by pressured difference developed within this static pressure bearing to operate to effectively support the weight of the tool mounting head. In this way, positioning of the cutting tool in the vertical direction is determined very precisely by rotation of the elevating feed screw, since no weight actually supported by the threads (and hence by a lubricating oil film thereon) of the elevating feed screw.

Use of this system enables the amount of tool shaft deviation to be held to less than 0.1 micron, even if the workpiece feed rate is of the order of 1m/minute, so that the present invention enables a substantially higher degree of productivity to be attained for ultra-high precision machining than has been possible with prior art types of grinding machines.

With regard to the second condition, concerning guidance precision of the tool shaft, the present invention utilizes a static pressure guide system in which static pressure bearings are disposed along the workpiece slide. The workpiece slide traverses a cross slide guide surface over with a rotary table being rotatably mounted on the workpiece slide. In prior art grinding machines, the tool mounting head is generally positioned for vertical movemement by what are sometimes called dynamic guide surfaces. An opposing guided surface on the tool mounting head slides relative to a guide surface, through the intermediary of a lubricating film of oil or grease, to provide smooth motion of the head in the vertical direction. However the lubricating film formed between each guide surface and the opposing guided surface does not in itself have the capability for restraining the tool mounting head, and hence the axis of rotation of the tool shaft, from tilting out of the vertical. Thus, when a tilting moment is applied to the tool mounting head, as a result of external forces being applied due to machining operations or due to a displacement of the center of gravity of the tool mounting head, then there will be insufficient resistance to this tilting moment. The tool mounting head will therefore become tilted by an amount which is determined by the size of the gap between the guide surace and the opposing guide surface. This makes the orientation of the cutting tool with respect to the workpiece to be unstable, thereby diminishing the accuracy of machining.

With the present invention, however, a compound guide arrangement is employed. In this case, at least one guide surface provided on the supporting columns serves as a reference guide surface, with a thin film of high pressure lubricant being forced between that reference guide surface and the opposing guided surface. A sufficient amount of frictional resistance is developed between this reference guide surface and the opposing guided surface to act to oppose forces applied to the tool shaft by machining operations, while at the same time the thin film of lubricant enables smooth movement of the tool mounting head in the vertical direction to be achieved. A plurality of other guide surfaces are also provided on the supporting columns, opposing adjacent guided surfaces formed on the tool mounting head, and these function as static pressure guide means, with pressurized fluid at constant pressure being forced between these guide surfaces and guided surfaces. As result of this static pressure fluid flow, forces are developed to counteract any tilting of the tool mounting head, and hence the tool shaft, so that the tool shaft is maintained in a precisely vertical orientation during raising and lowering of the tool mounting head, irrespective of forces applied due to machining. At the same time, the static pressure fluid flow serves to keep the guide surfaces and guided surfaces from coming into contact, so that there is negligible frictional resistance developed between these surfaces.

With regard to the third condition, i.e. improvement of the rigidity of the feed system, the static pressure bearing provided on the elevating feed screw (which is rotated to raise or lower the tool mounting head) and the load compensating system controlled thereby, referred to above, serve to provide a substantial improvement in this respect. For example in a prior art system in which such a static pressure bearing is not incorporated, a certain amount of "looseness" will be present in the feed mechanism for elevating the tool mounting head, due to the need to provide a layer of lubricant between the feed screw threads and the corresponding threads in which they engage, and due to the fact that the weight of the tool mounting head assembly is essentially supported by these threads and hence is applied to the lubricant layer on the threads. However with the present invention, since as described above the entire weight of the tool mounting head assembly is supported by an actuating rod controlled by a load compensation system (in the preferred embodiment, a hydraulic feedback loop), there is negligible load applied to the threads of the feed screw, so that an extremely "stiff" and rigid feed mechanism is attained.

With regard to the fourth condition, i.e. stability of machining accuracy with respect to vibration and heat, electric motors are employed for driving the mechanism which develop an extremely low amount of vibration. These motors are coupled through elastic coupling means to the driven members, in such a way that a negligible amount of motor shaft vibration is transmitted directly to the driven members. With regard to heat problems, the temperature of operation of the grinding machine is essentially determined by the temperature of the lubricating oil. For this reason, a special oil filter system is employed which also performs cooling of the oil, in such a way as to hold the temperature of the oil exiting from the filter system at a predetermined temperature, with only a small amount of fluctuation.

SUMMARY OF THE INVENTION

A machine tool having an elevating and guiding apparatus according to the present invention basically comprises a plurality of workpiece mounting jigs, a tool mounting head in which a tool is mounted for rotation, the tool mounting head being movable vertically between a pair of guide columns mounted on a bed, with a plurality of guide surfaces being provided on the guide columns and a plurality of corresponding guided surfaces being provided on the tool mounting head. A pressurized supply of lubricant is supplied to pass between at least one of the guide surfaces, which serves as a reference guide surface, and an opposing guided surface, to thereby form a thin film of pressurized lubricant between these surfaces. A flow of static pressure fluid is supplied to flow between the other guide surfaces and their opposing guided surfaces, whereby the guide surfaces and guided surfaces act to control movement of the tool mounting head in the vertical direction such as to provide smooth movement with tilting from the vertical being eliminated.

Such a machine tool further comprises an elevating feed screw mounted for rotation on the bed, engaging a threaded bore in the tool mounting head for moving the tool mounting head upward or downward, with a static pressure bearing being provided on the elevating feed screw and a load compensation system being coupled to that static pressure bearing for controlling movement of an actuating rod such as raise or lower the tool mounting head in a direction to equalize pressures within upper and lower pressure chambers of the static pressure bearing. This load compensation system thereby causes the actuating rod to effectively support the weight of the tool mounting head, with no load being applied thereto to the threads of the elevating feed scres.

The machine tool further comprises a workpiece slide which is transversely driven accross a cross slide guide surface formed on the bed, a rotary table which is rotatably mounted on the workpiece slide, with a plurality of workpiece holding jigs being mounted on the rotary table together with means for selectively tilting each jig when the corresponding workpiece is in position to be machined. Means are further provided whereby this tilting of the workpiece holding jig is controlled by output signals produced from the measuring means which monitor the orientation of the workpiece.

BRIEF DESCRIPTION OF THE DRAWINGS

FIG. 5 is a cross-sectional diagram taken in plan view, showing the configuration of a plurality of guide surfaces and guided surfaces of the guide columns and tool mounting head of the embodiment of FIG. 1.

DESCRIPTION OF THE PREFERRED EMBODIMENT

Figure 1:
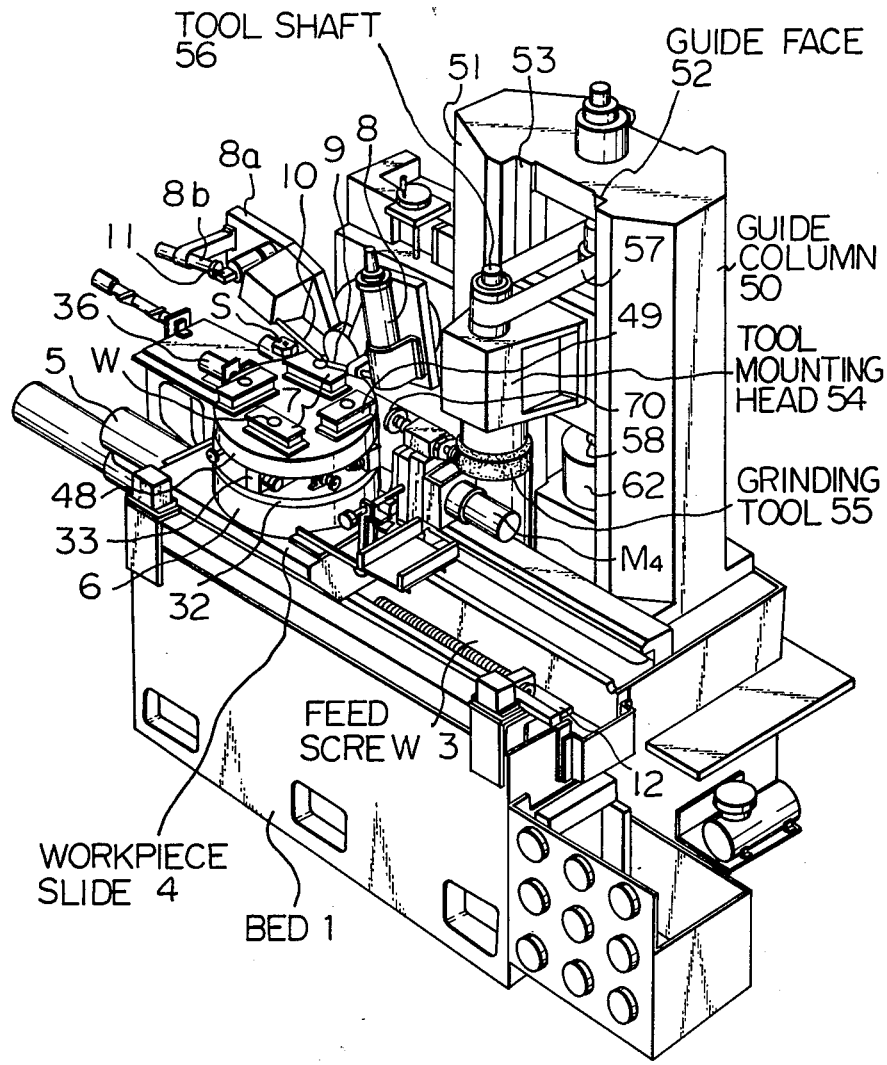
FIG. 1 is an oblique external view of an embodiment of a grinding machine according to the present invention.

FIG. 1 is an oblique external view of an embodiment of a grinding machine for quartz crystal elements, provided with an elevating and guiding apparatus according to the present invention. Numeral 1 denotes a bed, having a cross slide guide surface 2 formed on the upper part thereof, over which a workpiece slide 4 traverses, driven by a feed screw 3 which engages in a threaded bore in workpiece slide 4. The workpiece slide 4 is driven transversely over cross slide guide surface 2 by a control motor 5 which is coupled to rotate feed screw 3. A rotary table 6 is rotatably mounted on workpiece slide 4, with the rotation thereof being controled by a motor M1. A plurality of workpiece holding jigs 7 are mounted on a jig base 32 which is fixedly mounted on rotary table 6. The workpiece holding jigs are arranged in a circular array, concentric with the center of rotation of rotary table 6. Each workpiece holding jig 7 can be tilted in any direction with respect to the jig base 32, under the control of a motor M1, as described hereinafter. A workpiece W is retained by each workpiece holding jig 7, through vacuum suction. In the present embodiment, workpiece W comprises a piece of quartz crystal, and machining must be performed thereon with the crystal axes aligned in specific directions. X-ray means for monitoring the alignment of the crystal axes, denoted by numeral 8b, are provided on a mounting plate 8a which is fixedly mounted on bed 1 above rotary table 6. The X-ray measuring means comprise an X-ray emission tube 8, a projection tube 9, a receiving tube 10, a spectroscope 11, and a counting tube 12. Such means for measuring the alignment of crystal axes using X-rays are well-known, and will not be described in detail. Signals are produced by counter tube 12 which vary in accordance with the alignment of the crystal axes of the workpiece W which is currently in the measurement position, i.e. which is to be machined. These signals are utilized to control the rotation of motor M1 to thereby tilt the workpiece W into the correct orientation, as described hereinafter.

Figure 2:
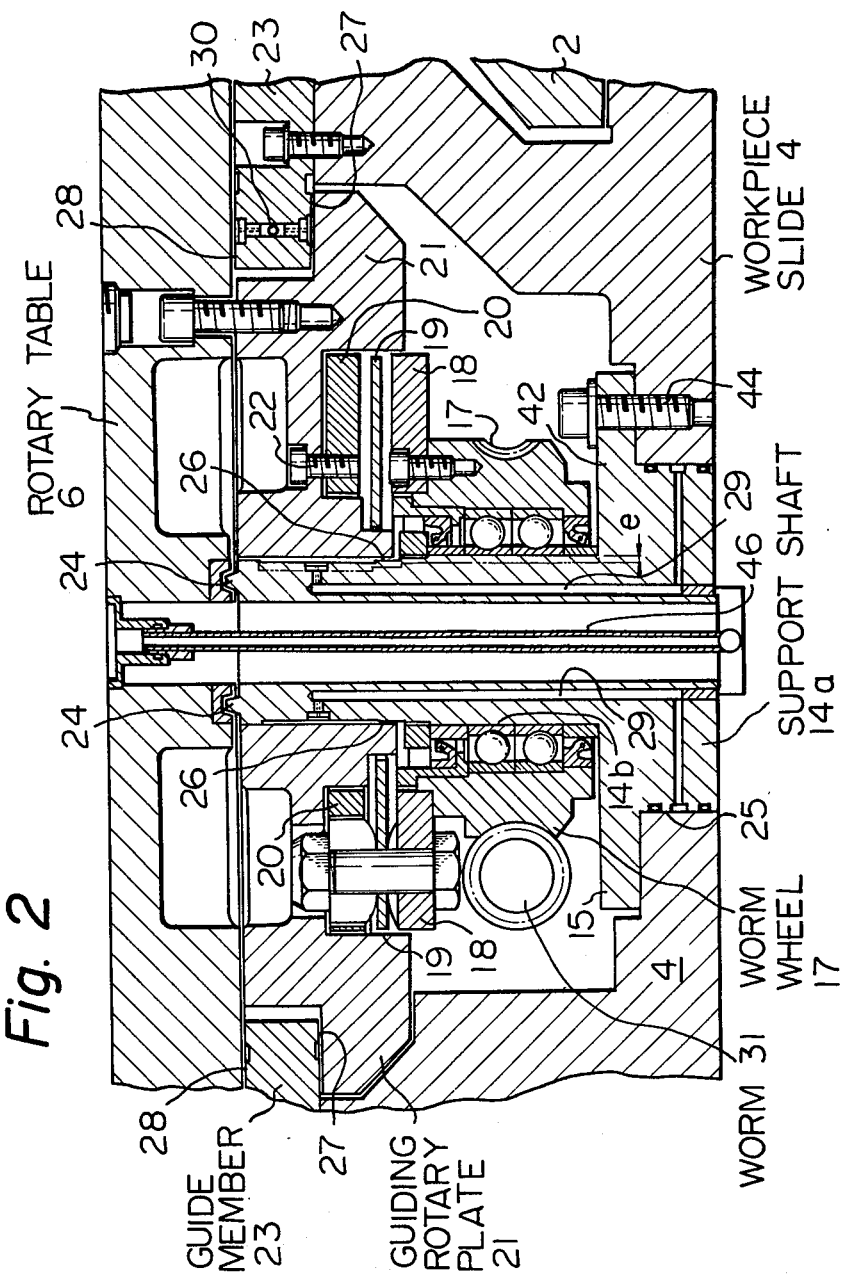
FIG. 2 is a cross-sectional diagram showing the configuration of a workpiece slide with a rotary table mounted thereon, in the grinding machine embodiment of FIG. 1.

The operation of rotary table 6 and workpiece holding jigs 7 will now be described, with reference to FIG. 2. In FIG. 2, a rotatable hollow support shaft 14a is provided at substantially the central portion of workpiece slide 4. A flange 15 is integrally formed on the lower end of support shaft 14a, with the outer end of flange 15 having a bore formed therein, through which a bolt 16 is passed to fasten support shaft 14a to workpiece slide 4. Numeral 17 denotes a worm wheel which is rotatably mounted on support shaft 14a, and is fixedly attached to a rotary drive disk 1. Rotary drive disk 18 is fixedly attached to the upper face of worm wheel 17 by bolts operating rod other suitable attachment means. Numeral 20 denotes a rotary driven disk, which is coupled to rotary drive disk 18 through a flexible joint 19. Joint 19 has rigidity in the direction of rotation thereof, but is flexible with respect to directions perpendicular thereto. Rotary driven disk 20 is attached to a guiding rotary plate 21 by a bolt 22. Numeral 23 denotes a guide member, which has a lower guide surface against which the guide surface (i.e. upper surface) of guiding rotary plate 21 abuts. Rotary plate 6 is fixedly attached to the top face of guiding rotary plate 21, with the lower face of guiding rotary plate 21 being supported by the top face of guide member 23. An annular projection 24 is formed on the upper end of support shaft 14a, and fits into an annular grove formed in the lower face of the central portion of rotary table 6. A circumferential portion 25 is also formed in support shaft 14a, encompassed by workpiece slide 4, and concentric with support shaft 14a. In addition, an eccentric circumferential portion 14b is also formed upon support shaft 14a, with the center thereof being offset from the axis of rotation of rotary table 6 by a predetermined amount e.

A guide surface 26 is defined between support shaft 14a and guiding rotary plate 21, a guide surface 27 is defined between guide member 23 and guiding rotary plate 21, and a guide surface 28 is defined between rotary table 6 and guide member 23. Each of these guide surfaces defines a static pressure guide surface, formed to include static pressure fluid pockets.

Numerals 29 and 30 indicate portions of a hydraulic circuit which is connected to a suitable source of hydraulic pressure. This hydraulic pressure, acting throught the static pressure gu surfaces described above, serves to exert self-aligning forces on rotary table 6, thereby enabling rotary table 6 to be rotated while maintaining a very accurate horizontal attitude.

Numeral 31 denotes a worm, which is rotated clockwise and counterclockwise by motor 5, and which meshes with worm wheel 17. As described hereinabove, it is an essential feature of the present invention that all sources of positioning error which can affect the orientation of workpiece W are reduced as far as possible. For this reason, means are provided for eliminating any backlash between worm wheel 17 and worm 31, as will now be described. The central axis of worm wheel 17 is fixedly mounted on the eccentric circumferential portion 14b of support shaft 14a, and is concentric with that eccentric circumferential portion. By minute amounts of rotation of support shaft 14a, the relative positions of worm 31 and worm wheel 17 can be very precisely adjusted into a correct meshing relationship, so that all backlash between these is eliminated.

Figure 3:
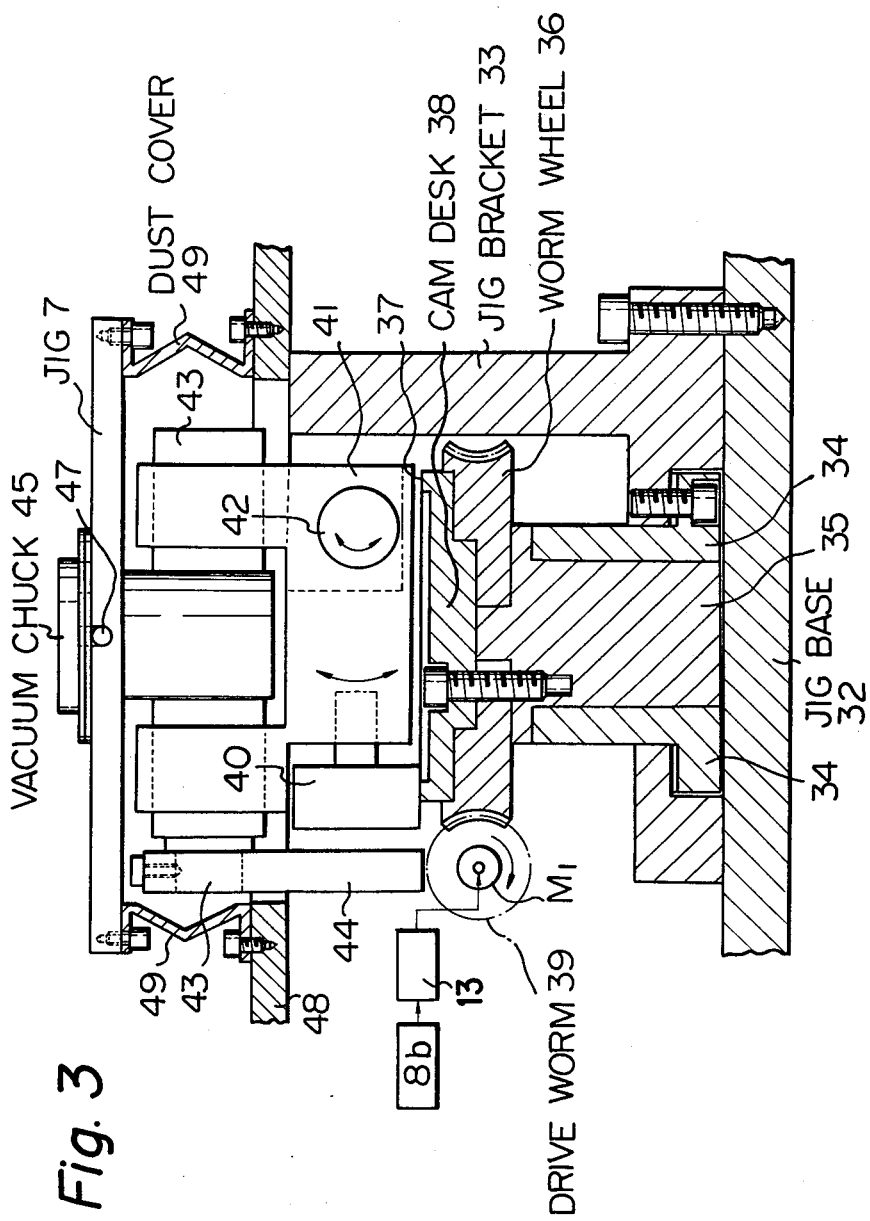
FIG. 3 is a cross-sectional diagram showing the configuration of a jib base having a plurality of workpiece holding jigs mounted thereon, in the grinding machine embodiment of FIG. 1.

Referring now to FIG. 3, numeral 32 denotes a jig base, which is attached to the upper face of rotary table 6. A plurality of jig brackets 33 are fixedly mounted on jig base 32 in a circular array, and serve to support the tilt control mechanisms of workpiece holding jigs 7. A cylindrical bearing 34 is mounted on each of these jig brackets 33, and a columnar member 35 is rotatably mounted within bearing 34. A worm wheel 36 is fixedly attached to columnar member 35, and has a cam disk 38 fixedly attached thereto. The upper face of cam disk 38 is formed as a high-low cam surface 37. Numeral 39 denotes a worm which meshes with worm wheel 36, and is driven by motor M1. Motor M1 is controlled by control means 13 in response to output signals from counter tube 8b of the X-ray measuring means.

Numeral 41 denotes a driven member having a roller 40 mounted thereon which abuts against the high-low cam surface 37. Driven member 41 is secured to a rotary shaft 42, which is rotatably supported by a jig bracket 33 so that driven member 41 can be swung about the central axis of rotary shaft 42. A rotary shaft 43 is rotatably mounted in driven member 41, with the axis of rotation thereof being disposed perpendicular to the axis of rotation of rotary shaft 42. Rotary shaft 43 has a workpiece holding jig 7 fixedly attached thereto, and has the upper end of a cam lever 44 fixedly attached to one end thereof. The lower end of cam lever 44 abuts against the cam surface of a cam plate (not shown), which swings about the central axis of rotary shaft 43. In this way, workpiece holding jig 7 can be swung about each of the mutually perpendicular longitudonal axes of rotary shafts 42 and 43.

A recess (not shown) is formed in the upper face of workpiece holding jig 7, with a vacuum chuch 45 being disposed therein to retain the workpiece W. Numeral 47 denotes a suction port, formed in vacuum chuck 45, which communicates with an evacuation pipe 46 (shown in FIG. 2) formed in support shaft 14a. A flexible dust cover 49 is provided between the lower face of workpiece holding jig 7, around the periphery thereof, and the upper face of a cover plate 48 which is fixedly mounted on jig bracket 33. This dust cover 49 permits workpiece holding jig 7 to be tilted in any direction, while at the same time preventing entry of foreign matter such as filings operating rod dust into the tilt control mechanism. Precise operation of the tilt control mechanism is thereby ensured.

Figure 4:
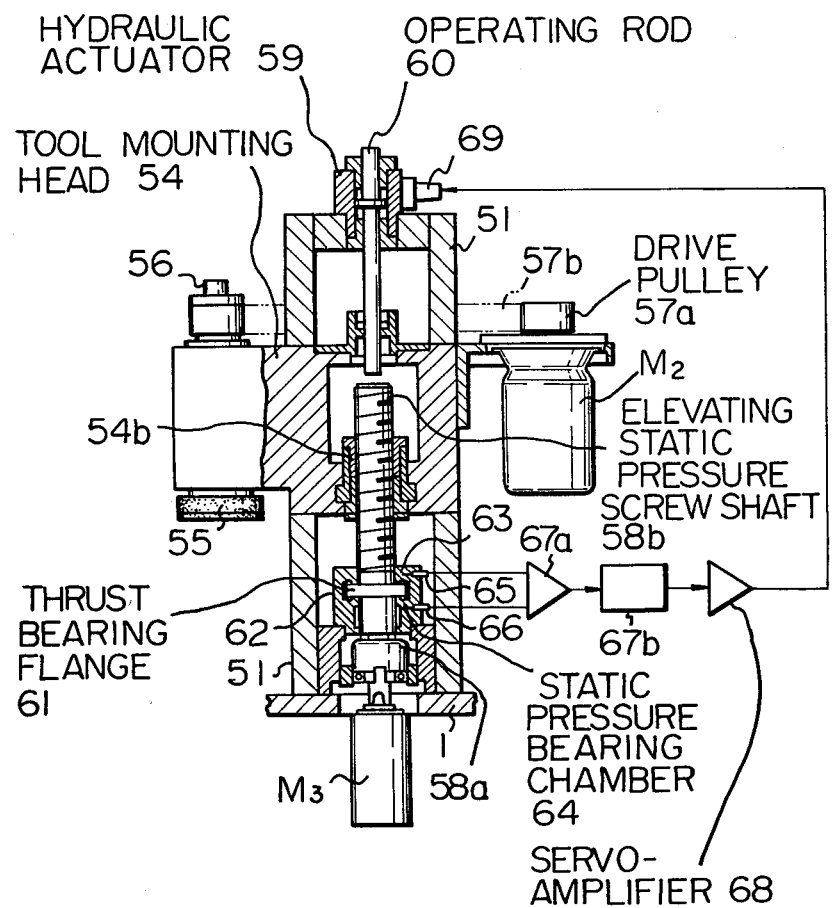
FIG. 4 is a cross-sectional diagram showing the configuration of an elevating feed screw and a tool mounting head, with a load compensation system coupled to a static pressure bearing on the feed screw, for the grinding machine embodiment of FIG. 1.

Referring again to FIG. 7, a pair of opposing guide columns 50 and 51 are mounted on bed 1, on one side of cross slide guide surface 2 of workpiece slide 4. Numeral 54 denotes a tool mounting head, which is provided with guided surfaces that are guided by opposing guide surfaces 52 and 53 on columns 51 and 50 respectively, as described in detail hereinafter. A tool shaft 56 having a grinding tool 55 mounted on the lower end thereof is rotatably supported on tool mounting head 54 by means of static pressure bearings. Tool shaft 56 is rotated by a belt 57b coupled between shaft 56 and a drive pulley 57a of a motor M2, which is fixedly mounted on thm 54. This configuration can be understood more clearly by referring to FIG. 4. Here as shown, tool mounting head 54 is provided with a threaded bore 54b in which is engaged an elevating static pressure feed screw 58b, which is driven through reduction gearing means 58b by a motor M3 mounted on bed 1. Numeral 59 denotes a hydraulic actuator which is fixedly mounted between the top ends of guide columns 50 and 51 and is coupled to the upper end of an actuating rod 60 whose lower end is fixedly attached to tool mounting head 54. The position at which operating rod 60 is attached to tool mounting head 54 can be adjusted in the vertical direction. Numeral 69 denotes a servo valve, which controls hydraulic actuator 59 to effectively support the weight of tool mounting head 54, through a control loop described in the following.

Numeral 61 denotes a thrust bearing flange which is formed around the circumference of the lower end of feed screw 58b, accommodated within a bearing box 62. Static pressure bearing chambers 63 and 64 are provided within bearing box 62, above and below flange 61, and serve as bearings for flange 61. These static pressure bearing chambers 63 and 64 are provided with pressure sensors 65 and 66, respectively, which produce signals indicating variations in the hydraulic pressures within these chambers. These signals are processed by a differential amplifier circuit 67a, compensation circuit 67b, and a servo-amplifier 68. Output signals thereby produced by servo-amplifier 68, indicating any difference between the pressures in static pressure bearing chambers 63 and 64, are applied to control servo valve 69, which thereby drives hydraulic actuator 59 to move operating rod 60 up operating rod down. This movement of operating rod 60 is in a direction such as to reduce any difference between the pressures in static pressure bearing chambers 63 and 64, i.e. to bring these pressures into balance. It can thus be understood that a servo feedback loop is formed whereby operating rod 60 supports tool mounting head 54 in a manner such that thrust bearing flange 61 is held in a fixed position with respect to bearing box 62, and hence in a fixed position with respect to bed 1, i.e. the entire weight of tool mounting head 54 is supported by operating rod 60. In this way, precise control of the vertical position of tool mounting head 54 by rotation of feed screw 58b is assured.

More specifically, when feed screw 58b is rotated to raise operating rod lower tool mounting head 54, then frictional and other forces are developed at the guide surfaces 52 and 53 of guide columns 51 and 50. As a result, resistance is exerted against movement of tool mounting head 54, whereby a load is applied to feed screw 58b. This load tends to cause a difference between the pressures within static pressure bearing chambers 63 and 64, and in response, the servo loop described above acts to move operating rod 60 in a direction such as to cancel this pressure change. For example, if the pressure within static pressure bearing chamber 63 should fall, and that within static pressure bearing chamber 64 should rise, then servo valve 69 will act on operating rod 60 such as to elevate tool mounting head 54, thereby compensating for the load being applied to feed screw 58b. The pressures within static pressure bearing chambers 63 and 64 are thereby equalized. If on the other hand the pressure in static pressure bearing chamber 63 should increase and that in chamber 64 should fall, then operating rod 60 will be lowered by hydraulic actuator 59, thereby again acting to equalize the pressures within static pressure bearing chambers 63 and 64.

It can be understood from the above that rotation of the elevating static pressure feed screw 58b results in the tool mounting head 54 being either raised or lowered, while the entire weight of tool mounting head 54 is supported by or 60. Thus, since no load is applied to the coupling between feed screw 58b and the threaded portion 54b of tool mounting head 54, vertical positioning of tool mounting head 54 can be accomplished to an extremely high degree of accuracy.

Referring now to FIG. 5, the relationships between guide surfaces 52 and 53, formed on guide column 51 and 50 respectively, and the corresponding guided surfaces formed on tool mounting head 54 will be described. The guide surfaces 53 which are formed on guide column 51 comprise an L-shaped rear guide surface having a side face A and a rear face B, and an L-shaped front guide surface having a side face C and a front face C. Guide surfaces 52 formed on guide column 50 comprise an L-shaped rear guide surface having a side face A', opposing side face A, and a rear face B', and an L-shaped front guide surface having a side face C' opposing side face C, and a front face D'.

The tool mounting head 54 has guided surfaces a, a', b, b', c, c' and d, d', opposing the guide surfaces A, A', B, B', C, C', D, and D' respectively. Eight sets of vertically extending static pressure fluid pockets P1, ..., P2, ..., P3, ..., P4, ..., P5, ..., P6, ..., P7, ..., and P8, ..., are formed between faces A and a, faces A' and a', faces B and b, faces B' and b', faces C and c, faces C' and c', faces D and d and faces D' and d', respectively. In the cross-sectional view of FIG. 5, only one of each of these sets of vertically extending static pressure fluid pockets (i.e. P1 to P8) is shown. A static pressure flow of fluid (in the present embodiment, hydraulic fluid) is supplied to the sets of vertically extending static pressure fluid pockets P1..., P2..., P3..., P4..., P5..., and P6... from a pressurized fluid source, through pressurized delivery piping, partially indicated by numeral 70. Lubricating oil is supplied from a pressurized oil source, through a fixed throttle valve and supply pipes 72, to the vertically extending sets of static pressure fluid pockets P7..., and P8..., and serves to maintain a thin high-pressure oil film between faces d and D, and faces d' and D', which serves to prevent these faces from coming into contact and thereby reduces friction during raising or lowering of tool mounting head 54 while machining operations are in progress and forces are therefore being applied against tool mounting head 54.

The other sets of vertically extending static pressure fluid pockets P1..., P2..., P3..., P4..., P5..., and P6..., serve to maintain tool mounting head 54 in a fixed attitude, preventing tilting from the vertical, and to prevent contact between tool mounting head 54 and the guide columns 50 and 51. For example, if a guided surface becomes tilted from the vertical, i.e. with respect to a corresponding guide surface, then in the gap between these surfaces which is widened by this tilting, the fluid pressure will be decreased, while in the gap which is narrowed by this tilting, the fluid pressure will be increased. Thus, a force will be exerted within the tapered clearance between the guide surface and the guided surface, acting in a direction such as to restore the orientation of tool mounting head 54 from the tilted to the vertical orientation. In this way tilting of tool mounting head 54, both with respect to back-to-front movement and with respect to side-to-side movement, is eliminated, i.e. the system is self-aligning. This static pressure control thereby ensures that the guided surfaces are held parallel to the guide surfaces at all times, while tool mounting head 54 is being raised or lowered.

It can be understood from the above that the self-aligning action described therein will serve to maintain the extremely small clearance between faces D and d and D' and d' respectively, which are separated only by a thin film of high-pressure lubricating oil. The guide surfaces D and D' therefore determine the precise position of tool mounting head 54, and can therefore be considered as reference surfaces.

After passing through the static pressure fluid pockets P1, ..., P2, ..., P3, ..., P4, ..., P5, ... and P6, ..., the static pressure fluid is recovered an passed through recovery piping (not shown in the drawings) to be subsequently returned to the static pressure fluid pockets under pressure. The lubricating oil which has passed through fluid pockets P7, ..., and P8, ..., is also recovered, and then passed through a special oil filter. This utilizes an oil tank having a plurality of compartments, with the oil flowing successively from a recovery port through these compartments, in which contaminating elements in the oil are removed. Upon exit from the final compartment, the oil is pumped back for use as lubrication. In order to maintain the oil temperature constant to a high degree, it is pumped out of the first, i.e. recovery port, compartment, passed through an oil cooler, and returned to the same compartment. This process is performed in each of the successive compartments, and in this way the oil temperature is held constant to within 5 C in the first compartment, and to within ±0.1 C or less in the final compartment.

When the shape of the grinding surace of grinding tool 55 has deteriorated to a specific extent, a rotary dresser 70 shown in FIG. 1 is pressed into contact with the grinding surface, to correct the shape. This rotary dresser 70 is mounted on workpiece slide 4 and rotated at a higher speed than that of grinding tool 55 by a motor M4.

As described in the above, the present invention employs a plurality of static pressure bearings. It is a feature of such bearings that the pressure in the gap between a guide surface and guided surface is held constant, and this is a basic reason for the high degree of precision obtainable with the present invention. Although not described in the above, means can be employed to reduce guiding errors with respect to movement along the cross slide guide surface 2, i.e. pitch and yaw. These means act to alter the gap between the guide surface and a guided surface provided on the workpiece slide 4, such as to mainain a desired guide position. Such means can employ, for example, laser means to measure the guiding errors of workpiece slide 4 at a number of different positions of workpiece slide 4, before the grinding machine is put into actual operation. Measured values representing these errors can then be stored in memory means, and a control circuit and converter provided for converting these measured values stored in the memory into hydraulic pressure values. These values can then be utilized to control the guide surface error by controlling the fluid pressure supplied to the static pressure bearings, i.e. with the amount of correction being determined by the position of workpiece slide 4 as it moves over the cross slide guide surface 2.

In order to machine a plane surface to a very high degree of precision, it is necessary that the attitude of that surface be maintained in a highly constant attitude. With the present invention, the pressure of the fluid supplied to the static pressure bearings of the rotary table guide portions serve to ensure this high degree of attitude accuracy, enabling such high precision to be attained.

As described above, the present invention comprises a workpiece orientation measurement function, and a function for controlling the attitude at which the workpiece is mounted with respect to a reference direction, together with a system for rotating a rotary table to a high degree of accuracy, in order to set the workpiece in a predetermined position for machining.

In addition, the present invention comprises a load compensation system, whereby the weight of the tool mounting head is supported by means which are separate from the means whereby the tool mounting head is moved and fixed in position with respect to the vertical direction.

The present invention further comprises a system for maintaining the tool mounting head aligned in a precise fixed relationship with respect to a reference guide surface, irrespective of vertical movement of the tool mounting head and forces applied thereto during machining operations. This system comprises a plurality of static pressure guide surfaces and static pressure guiding surfaces, between which a flow of static pressure fluid acts to provide compensation against any tilting of the tool mounting head, i.e. to provide an automatic self-restoring action.

As a result of the combination of features described above, a grinding machine according to the present invention can machine a workpiece to a very high degree of precision, e.g. to an accuracy of less than one micron.

Although the present invention has been described with respect to an embodiment which employs hydraulic pressure in the static pressure bearings, it is equally applicable to the use of pneumatic pressure in these bearings. Furthermore, the present invention is applicable to the use of machining tools other than grinding tools.

Thus, although the present invention has been described hereinabove with reference to a specific embodiment, this description is to be interpreted in an illustrative, and not in a limiting sense, since various changes and modifications to the described embodiment may be envisaged, which fall within the scope claimed for the present invention, as laid out in the appended claims.

What is claimed is:

1. A machine tool elevating and guiding apparatus, comprising:
   a bed having a pair of opposing guide columns fixedly mounted thereon, with a plurality of guide surfaces including at least one reference guide surface being formed on said guide columns;
   a tool mounting head having a threaded bore provided therein and a plurality of guided surfaces formed thereon, said tool mounting head being positioned between said guide columns with each of said guided surfaces opposing and closely adjacent to a corresponding one of said guide surfaces;
   means for supplying a flow of static pressure fluid passing between said guide and guided surfaces other than said reference guide surface and a guided surface opposed thereto;
   a vertically extending elevating feed screw rotatably mounted on said bed, engaging with said threaded bore in said tool mounting head;
   a static pressure bearing provided on said elevating feed screw, said static pressure bearing including upper and lower static pressure chambers;

an actuating rod movably mounted on said guide columns and coupled to said tool mounting head;

load compensation means for sensing a difference between the pressures in said upper and lower static pressure chambers of said static pressure bearing, and responsive to said pressure difference for moving said actuating rod and thereby moving said tool mounting head vertically, in a direction such as to cancel said pressure difference, whereby the weight of said tool mounting head is effectively supported by said actuating rod;

drive means for rotating said elevating feed screw to selectively raise and lower said tool mounting head;

a tool shaft rotatably mounted in said tool mounting head;

drive means for rotating said tool shaft;

a machining tool fixedly mounted on said tool shaft, and;

workpiece retaining means for holding a workpiece in a fixed position below said grinding tool.

2. An apparatus according to claim 1, in which said load compensation means comprise:

pressure sensors coupled to said upper and lower static pressure chambers of said static pressure bearing, for producing electrical signals indicative of said pressure difference;

servo amplifier circut means responsive to said electrical signals for producing control signals;

a servo valve controlled by said control signals, and;

a hydraulic actuator coupled to said actuating rod and actuated by said control valve to move said actuating rod in a direction determined by said control signals such as to reduce said pressure difference.

* * * * *